May 14, 1968  J. A. COLE  3,382,705

DEVICES FOR TRANSMITTING SIGNALS

Filed March 18, 1965  2 Sheets-Sheet 1

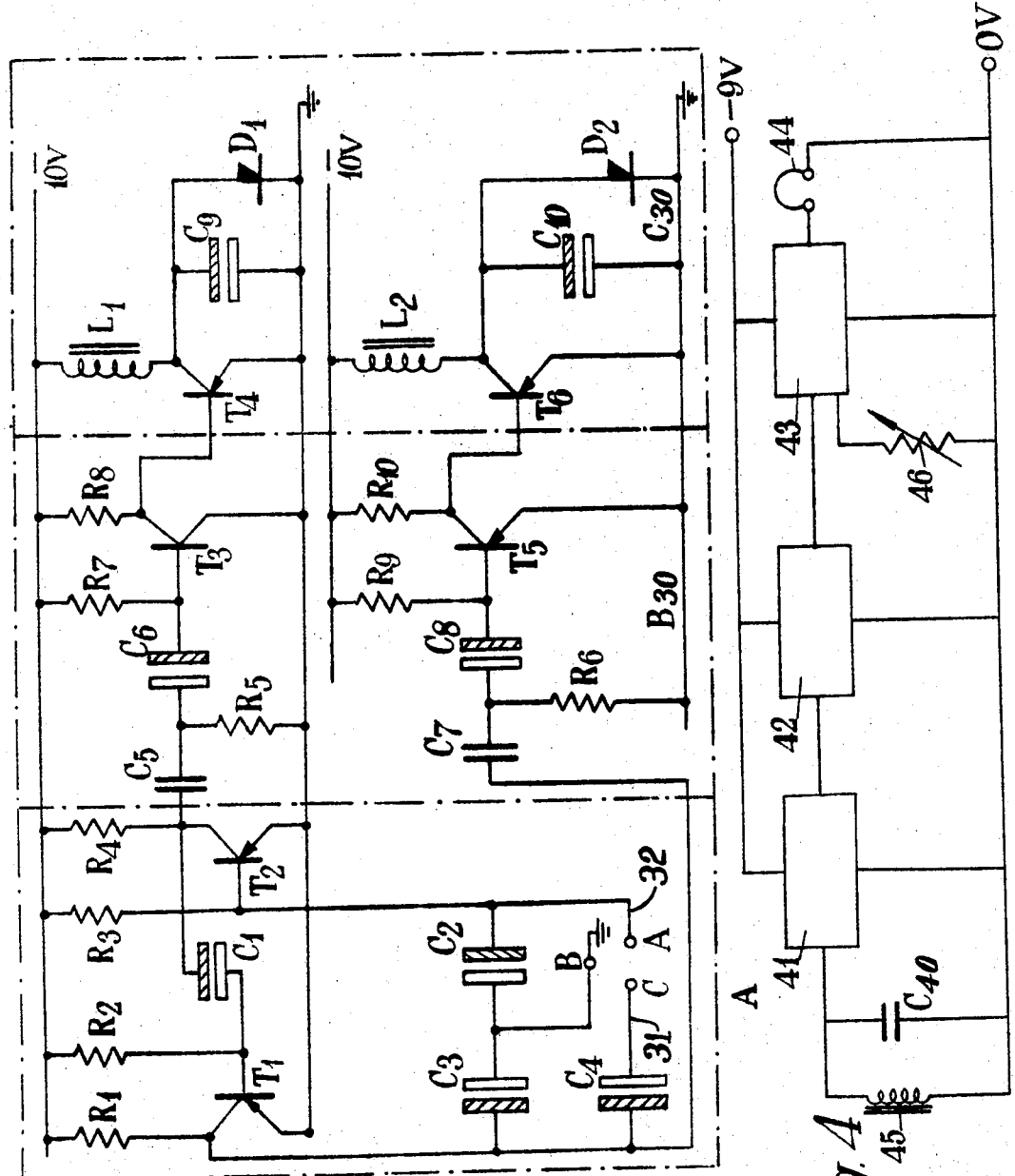

United States Patent Office 3,382,705
Patented May 14, 1968

---

3,382,705
DEVICES FOR TRANSMITTING SIGNALS
John Alexander Cole, Henley-on-Thames, England, assignor to The Water Research Association, Marlow, England, a British company
Filed Mar. 18, 1965, Ser. No. 440,863
Claims priority, application Great Britain, Mar. 24, 1964, 12,479/64
4 Claims. (Cl. 73—40.5)

ABSTRACT OF THE DISCLOSURE

The invention comprises a device adapted to be moved within the interior of a fluid flow system for detecting leaks. It comprises a pair of solenoids arranged at an angle to each other for intermittently and alternately developing a magnetic field which is detectable outside the system. A source of direct current is provided for energizing the solenoids and an electric circuit arranges for the intermittent and alternate connecting of the solenoids to the source of direct current. Pressure responsive switches are included in the device and they are closed and opened selectively in response to the pressure encountered from opposite ends of the device. They control the frequency of the intermittent connecting and disconnecting of the solenoids to the direct current source, the device being equipped with transverse members relative to the interior of the system to effect movement of the device within the system by a fluid flow acting against the members. Detecting means are disposed outside the system for detecting the frequencies of the intermittent connecting and disconnecting of the respective solenoids by receiving the radial magnetic fields emitting therefrom.

---

This invention relates to devices for transmitting signals and has for its object to provide a convenient form of device which can be disposed within or propelled along the interior of a pipe, tube, conduit or other enclosure and which enables signals to be transmitted to a detector device situated outside the pipe or enclosure. The invention can be employed to particular advantage with pipes or the like of ferrous material, but is not restricted to such uses.

The object of the invention is to provide a device for detecting leaks in a pipe or enclosure having means for creating a modulated or varying magnetic field capable of being detected outside the pipe or enclosure.

A special object of the invention is to provide such a device which gives a magnetic field with no overall null point.

This magnetic field is varied or modulated in response to pressure conditions within the pipe, so that for example leaks may be located by detecting and interpreting the signals received.

The invention also consists in a device adapted to be disposed within the interior of a longitudinal extending fluid flow system, a first solenoid, a second solenoid at an angle to said first solenoid, means providing a supply of direct current to said solenoids for creating a magnetic field of such strength as to be detectable outside the system and including an electrical circuit adapted to intermittently and alternately connect and disconnect the solenoids to the means for supplying direct current, means responsive to pressure conditions within said system electrically connected in said circuit to effect modulation of the magnetic field in accordance with said pressure conditions by changing the frequency of said connection and disconnection of the solenoids to the means supplying direct curent, means situated outside the system for detecting the modulated magnetic field and rendering a pressure condition readout in terms of said field, said device further including portions disposed transversely across the interior of said system to effect movement of said device within the system by means of fluid flow acting on said portions.

The invention also consists in the combination with such a device of a detecting means, e.g. one or more electrical coils, located outside said pipe or the like, the arrangement being for instance such that an alternating or intermittent voltage which can be amplified for the purpose of detection or measurement is induced in the detection means when the magnetic field is modulated or varied.

The detection means is preferably, but not essentially, an inductive coil.

In the present invention, the means for creating a modulated or varying magnetic field in a pair of solenoids arranged at an angle to, and operable alternately with one another, so as to produce an overall radial field distribution containing no null points.

Usually, they will be at right angles so that when one solenoid is perpendicular to the detector the other will be in its most effective position parallel to the detector.

It is advantageous for the coils each to have a ferrite core. It should be noted that the coils should not be energised simultaneously, since this would provide a single resultant which itself could arrive at a position perpendicular to the detector if the device turns to a corresponding orientation.

In a convenient arrangement for transmitting information regarding pressure conditions in the pipe or tube, the device is provided with a pressure differential switch arranged to be responsive to variations in pressure across a diaphragm situated transversely with respect to the pipe; accordingly the frequency of modulation of the magnetic field may be varied.

The invention is not restricted to the examples described and it will be understood that the device need not include cleaning or scraping devices, as for example in a device intended solely for leakage detection. The invention is intended particularly for use in pipes as employed by the water and oil industries, but is not restricted to such uses.

The invention will be further described with reference to the accompanying drawings, in which:

FIGURE 3 is the circuit diagram of a transmitter which may be used in conjunction with the embodiment of FIGURE 1; and FIGURE 4 is the circuit diagram of the corresponding detector.

Figure 1:
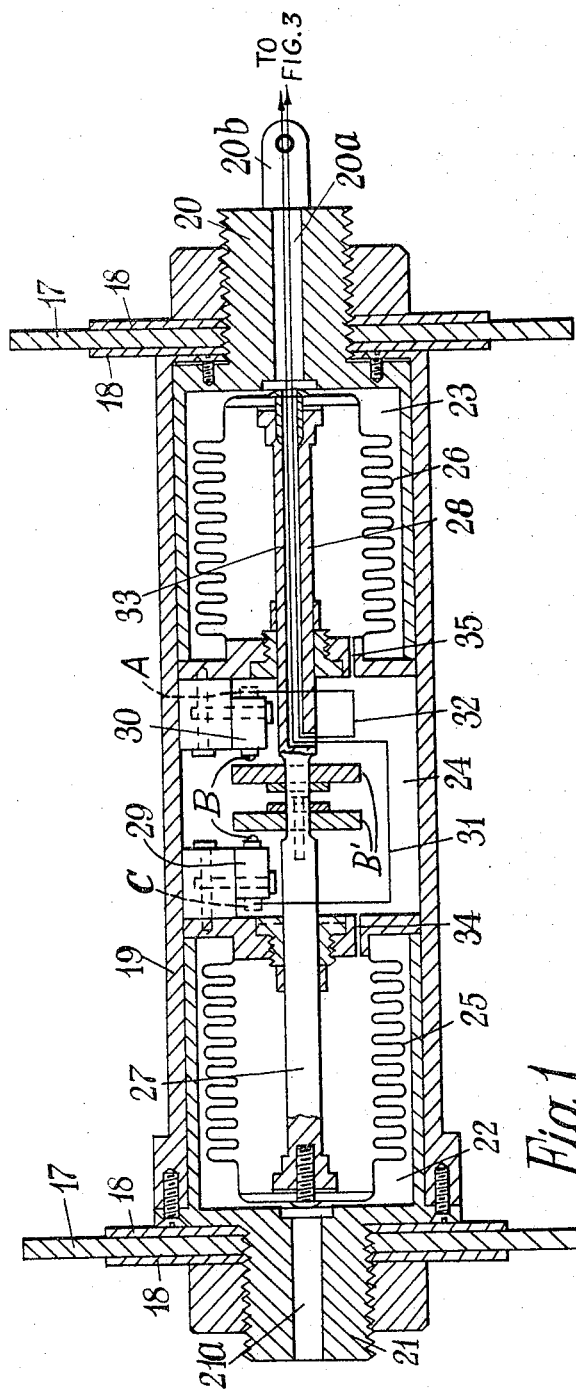
FIGURE 1 is a longitudinal section through the portion of the device of the invention provided with pressure sensitive means.

In FIGURE 1 a construction of the device of the present invention is shown which, in combination with a suitable transmitting circuit, allows for leak detection.

In this embodiment, a rubber disc 17 clamped between plates 18 is provided at each end of the device which in this case has a cylindrical body 19 with narrower cylindrical ends 20 and 21.

Within the cylinder defined by 19 are two bellows compartments 22 and 23 and a central compartment 24. Each bellows compartment has within it a bellows (25, 26) mounted on a rigid rod member 27–28 which passes through the central compartment and operates two microswitches (29, 30). Electric leads (31, 32) pass from the microswitches down through a central axial bore 33 in rod 28 and to a solenoid-controlled transmitting circuit described in more detail below with reference to FIGURE 3. Central axial bore 33 is plugged with e.g. a thermosetting resin and thus the central compartment and the inside of the bellows are sealed off from the liquid.

Further holes 20a, 21a are formed in the cylindrical ends 20 and 21 respectively, and the two bellows compartments are connected to the central compartment by bleed holes 34 and 35. It will be seen that the bellows are responsive to the difference between the liquid pressure at the forward end 21 of the device and the liquid pressure at the rear end 20 of the device. A towing eye 20b is provided at one end of the device.

Figure 2:
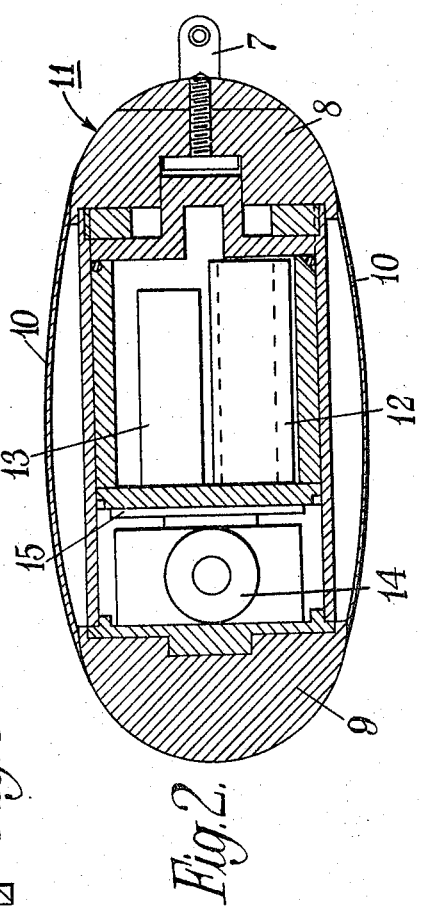
FIGURE 2 is a longitudinal section through a transmitter of the device according to the invention.

Referring now to FIGURE 2, a flexible member (not shown but of conventional type) is provided which attaches to eye 20b. The flexible member is connected at its other end to a similar eye 7 in one end of a transmitter assembly which has protective end caps 8 and 9 one of which (8) has eye 7 fixed to it.

The long sides of the transmitter assembly are defined by skids 10 which reduce friction with the wall of the main.

Within the transmitter assembly is a sealed cylindrical body 11 containing a battery compartment 12, a relay 13, a transmitter 14 (which is essentially solenoids $L_1$ and $L_2$ of FIGURE 3) and board 15 upon which are assembled the various components of a transistorized pulse transmitting circuit, as described in more detail with reference to FIGURE 3.

For leak detection the device operates as follows:

The section of the water main containing the leak is isolated and the device is placed at a known position within the main. This is conveniently carried out by increasing the pressure on one side of the device so that it moves, and releasing the pressure (or equalising it from the other side) when the desired position is reached. Water is then pumped into each end of the section through a bypass pipe fitted with a flow-meter. It will be seen from FIGURE 1 that either switch 30, or switch 29 or neither switch may be closed, and normally the pressure of the water being pumped in at each end is chosen so that neither switch is closed. The flow rates are recorded when this state is reached.

The device is then moved along the main for a known distance and similar readings are taken, and the process is then repeated along the main to give a series of readings. A sudden discontinuity in the readings indicates that the device has moved from one side to the other of a leak.

FIGURE 3 shows a typical circuit which is capable of transmitting the pulses of varying frequencies which indicate when the pressures are balanced, or their direction of unbalance. It consists of three main portions.

A. An oscillator portion generating low frequency pulses and consisting of a multivibrator timing circuit of transistors $T_1$ and $T_2$ and capacitor $C_1$ (and their associated resistors $R_1$, $R_2$, $R_3$, and $R_4$) connected as shown in FIGURE 3, together with capacitors $C_2$, $C_3$ and $C_4$. The pressure-sensitive switches can now connect either AB (shorting out $C_2$ and giving only $C_3$ in that part of the circuit), or BC (giving $C_2$ to ground, and $C_3$ and $C_4$ in parallel with each other to ground) or, as shown, connect neither (giving $C_2$ and $C_3$ each to ground).

b. Amplifier portions consisting of $C_5$ and $C_6$, $T_3$ and $R_5$, $R_7$ and $R_8$ connected to one output of the multivibrator, and $C_7$, $C_8$, $T_5$, $R_6$, $R_9$ and $R_{10}$ connected to the other output of the multivibrator which is thus in antiphase with the first output. The pulse amplified by these is fed to:

C. The transmitter portion, consisting of power transistor $T_4$, transmitter solenoid $L_1$, capacitor $C_9$ and diode $D_1$ (and $T_6$, $L_2$, $C_{10}$ and $D_2$). Solenoids $L_1$ and $L_2$ are the coils which lie at an angle, preferably a right angle, to one another. It will be seen that they cannot be energised simultaneously.

The varying magnetic field transmitted may be detected by a receiving circuit of the type shown in FIGURE 4, in which 41 is an emitter follower, 42 a two-stage amplifier and 43 a 1000 c.p.s. oscillator. Other circuit elements are earphones 44, detector coil 45 and a bias control variable resistance 46.

When the receiving circuit is placed with its detector coil end-on, or nearly end-on to either of the transmitting solenoids, it will be affected by pulses of 30 c./s. magnetic fields radiated by the end-on solenoids. The detector coil, which is tuned to 30 c./s. by a parallel condenser, transforms the small magnetic field from the transmitter into a voltage of similar form.

The emitter follower matches the coil to the amplifier where the coil output voltage is amplified to a level suitable for switching on the 1000 c./s. oscillator which, under no signal conditions, is just biassed off by the bias control.

When the oscillator is switched on the operator hears a 1000 c./s. note modulated by the 30 c./s. signal from the transmitter. The operator thus hears pulses of the modulated 1,000 c./s. tone. The frequency of these pulses is dependent on the position of the contact B shown in FIG. 3, and thus dependent on the pressure gradient along the device shown in FIG. 1. By suitable choice of capacitors $C_2$, $C_3$, and $C_4$ together with resistor $R_3$, it is possible to make these pulses appear at intervals of 1, 2, or 4 seconds corresponding to pressure gradient nil, right to left, and left to right, respectively.

By way of example, with the external circuit working at 9 v., 41 may be the twin emitter follower TS17, 42 the wide band amplifier TS3 and 43 the 1000 c./s. oscillator TS1, of Venner Electronics, Ltd., Kingston-by-Pass, New Malden, Surrey, England.

Various modifications may be made within the scope of the invention as defined in the appended claims and as described above, thus, the invention, although primarily intended for use in water mains may also be used in e.g. oil pipe-lines. With large diameter mains, it is an advantage to have the transmitter within, instead of towed by, the cleaning ferret.

I claim:

1. In a device adapted to be disposed within the interior of a longitudinally extending fluid flow system, a first solenoid, a second solenoid at an angle to said first solenoid, means providing a supply of direct current to said solenoids for creating a magnetic field of such strength as to be detectable outside the system and comprising an electrical circuit adapted to intermittently and alternately connect and disconnect the solenoids to the means for supplying direct current, means responsive to pressure conditions within said system electrically connected in said circuit to effect modulation of the magnetic field in accordance with said pressure conditions by changing the frequency of said connection and disconnection of the solenoids to the means supplying direct current, means situated outside the system for detecting the modulated magnetic field and rendering a pressure condition readout in terms of said field, said device further comprising portions disposed transversely across the interior of said system to effect movement of said device within the system by means of fluid flow acting on said portions.

2. The device of claim 1 wherein said first and said second solenoids are disposed at an angle of 90°.

3. In a device adapted to be disposed within the interior of a longitudinally extending fluid flow system, means for creating magnetic fields of sufficient strength as to be detectible outside the system, said means comprising a pair of solenoids oriented at an angle to provide uniform radial magnetic field distribution as each solenoid is energized, a source of direct current, an electrical circuit for intermittently and alternately connecting the solenoids to the source of direct current, pressure responsive switch means in said electrical circuit responsive to pressure conditions within said system to control the frequency of said intermittent connecting and disconnecting of the solenoids to said source in accordance with pressure changes, means disposed outside the system for detecting the frequencies of said intermittent connecting and disconnecting of the respective solenoids by receiving the radial magnetic fields, readout means responsive to said means outside the system, and said device further comprising members disposed transversely across the interior of said system to effect movement of said device within the system by fluid flow acting on said members.

4. The device of claim 3 wherein said solenoids are fixed at an angle of 90° relative to each other.

References Cited

UNITED STATES PATENTS 3,196,686   7/1965   Cole _____ 73—40.5 X

DAVID SCHONBERG, *Primary Examiner.*

LOUIS R. PRINCE, *Examiner.*

D. O. WOODIEL, *Assistant Examiner.*